United States Patent [19]
Astl

[11] 3,735,604
[45] May 29, 1973

[54] EVAPORATIVE WATER COOLER
[76] Inventor: Jaromir Astl, 626 Circle Drive East, Solana Beach, Calif. 92075
[22] Filed: July 2, 1971
[21] Appl. No.: 159,354

[52] U.S. Cl..................................62/316, 62/389
[51] Int. Cl..............................................F28d 5/00
[58] Field of Search....................62/304, 310, 315, 62/316

[56] References Cited
UNITED STATES PATENTS

| | | | |
|---|---|---|---|
| 2,048,902 | 7/1936 | Velut | 62/316 |
| 2,099,157 | 11/1937 | Wiggenhorn | 62/304 |
| 2,766,597 | 10/1956 | Gieck | 62/304 |
| 3,362,186 | 1/1968 | Patterson | 62/304 |

Primary Examiner—Meyer Perlin
Attorney—Carl R. Brown and Neil F. Martin

[57] ABSTRACT

A device using the principles of evaporative cooling is used to cool water purified by a water purifier based on reverse osmosis technology. The outside surfaces of the existing water purifier is covered by a sleeve of porous material. This assembly is installed in a container having numerous holes in its walls to provide for air circulation. The waste water produced by the purifier is continuously discharged so as to wet the porous sleeve. Excess waste water accumulates in the bottom of the container and upon reaching a predetermined level is discharged to the drain. Water evaporating out of the sleeve removes heat and therefore cools down the sleeve-purifier assembly and the purified water contained within.

4 Claims, 3 Drawing Figures

EVAPORATIVE WATER COOLER

BACKGROUND OF THE INVENTION

There are existing home water purifiers, as for example one described in the patent application filed on Aug. 22, 1969, Ser. No. 852,193, now abandoned, and in the continuation of application filed Sept. 25, 1970, Ser. No. 75,699, titled "A Water Purifying Device," which produce high quality water by application of reverse osmosis technology. The purified water is usually produced at a relatively slow rate and is stored in a suitable container which may be part of the purifier itself. The stored water, due to its prolonged exposure to its surroundings, will eventually attain the temperature prevailing at the location of installation. Since the majority of these units are installed inside of a home, the temperature of the purified water will constantly be around 70° – 80° F., and during some portions of the year possibly even higher. Because a large portion of this pure water is used as drinking water, its palatability would be enhanced if its temperature could be reduced, especially if such cooling could be accomplished without undue increase in operational costs.

Thus it is advantageous to have a new and improved evaporative water cooling device that is capable of cooling the product water stored within a known home water purifier to a temperature lower than the prevailing room temperature, that requires no additional source of energy to effect such cooling, that does not adversely affect the economy of the purifier operation, that is mechanically highly reliable and that can be made of non-corrosive materials.

SUMMARY OF THE INVENTION

In an embodiment of this invention, a conventional water purifier is provided on its outside surface with a tightly fitted porous wall sleeve able to transport water throughout its surfaces by capillary action and this assembly is placed inside a container. The container has an outlet for the discharge of excessive cooling water and incorporates in its body numerous vent holes and mounting pads necessary for installation. Furthermore, the container has clearance holes needed for the installation of the known purifier's product water outlet and an actuator lever needed for actuation of the conventional control valve. The known waste water outlet of the purifier is connected to a waste water dispenser which consists of a number of supports and a dispenser tube. The dispenser tube is provided with multiple holes. The waste water emerging from the conventional purifier is delivered through a waste water link into the dispenser tube out of which it drips or squirts onto the porous sleeve. Upon entering the porous sleeve, the waste water is further transported within the sleeve itself by capillary action until the whole sleeve is saturated with moisture. Thus, all of the air-exposed areas of the wet sleeve become evaporative surfaces. Since the container is provided with a multitude of vent holes for air circulation, evaporation of the waste water will be continuous. Waste water will extract the heat needed for its evaporation from the sleeve and from the known purifier and product water stored within, thus cooling off the stored product water to a temperature below the prevailing temperature of the atmosphere, making the product water more suitable for drinking.

It is, therefore, an object of this invention to provide a new and improved home water purifying device able to provide home drinking water which is cooled and therefore more desirable to drink.

Another object of this invention is to provide a new and improved home drinking water purifier able to supply cooled drinking water at no penalty to the known purifier's economy.

It is another object of this invention to provide the desired cooling of the drinking water by a device having no moving parts or components and, therefore, being highly reliable.

Another object of this invention is to provide a new and improved home drinking water cooler that is compact in size and that is made of non-corrosive materials.

Another object of this invention is to provide a new and improved home water purifier able to supply cooled drinking water and in which an evaporative cooling circuit is designed to combine the function of distribution of waste water used for cooling with the function of an independent air gap as specified by applicable plumbing codes and so provide a safer and simpler device.

Other objects and advantages of this invention will become more apparent upon reading of the following detailed description and an examination of the drawings wherein like reference numerals designate like parts throughout and in which.

Figure 1:
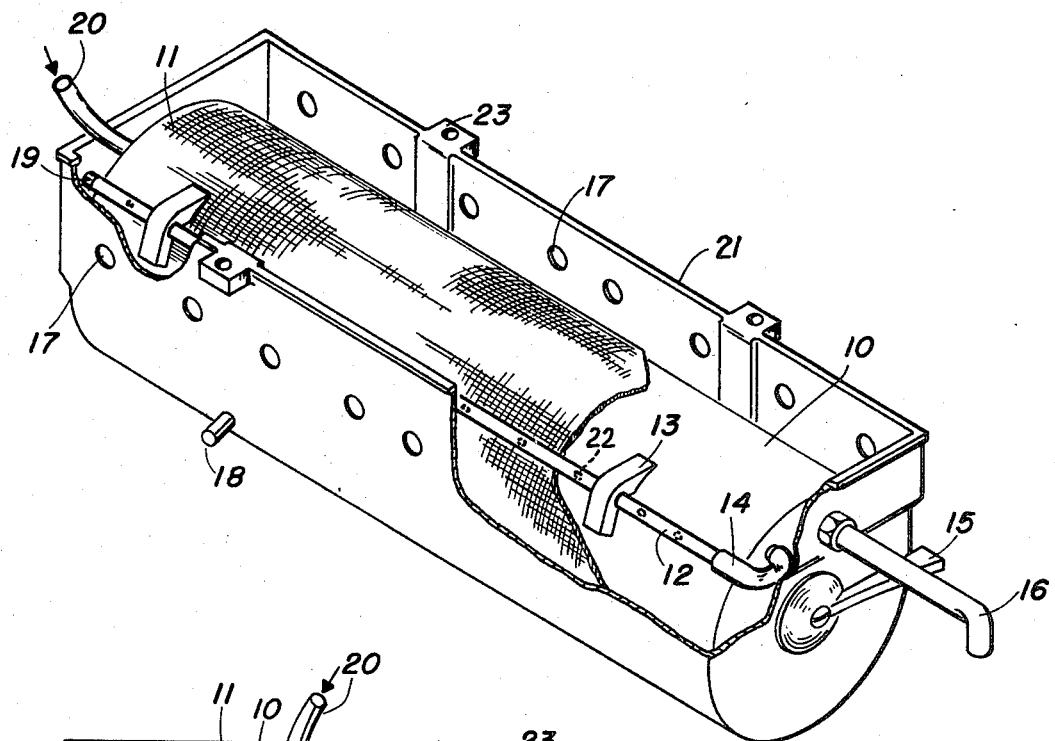
FIG. 1 is a perspective view, with sections broken away, of an embodiment of this invention.

Referring now to FIG. 1, the known home water purifier 10 is provided on the outside surface of its cylindrical body with a tightly fitted sleeve 11, made of highly porous materials of knitted, woven, felt-like or foam-like construction able to transport water within its body by capillary action and is then installed inside the evaporative cooler body 21. The body of said evaporative cooler has mounting pads 23 to facilitate installation. Furthermore, a sufficient number of air vent holes 17 is provided in the walls of the cooler body 21 so that atmospheric air can freely circulate through the inner volume of said evaporative cooler. In addition, the said cooler body 21 has an opening necessary for the installation of the valve actuator lever 15, delivery spout 16, and waste water overflow outlet 18. The cooling water dispenser assembly consists of a number of supports 13 and the cooling water distributing tube 12. The cooling water distributing tube 12 has in its wall a multitude of orifices 22, through which the cooling water is dispensed and is held in proper operating position shown by a number of supports 13, of which the legs are wedged between the inner wall of the evaporative cooler body 21 and the outside surfaces of the sleeve 11. One end of the distributing tube 12 is sealed off by a seal plug 19, while the other is connected by means of flexible tubing 14 to the known waste water outlet of the known home water purifier 10. Feed water needed for the operation of the evaporative cooler assembly is introduced by means of flexible tubing 20.

Feed water to be purified and cooled, such as tap water from a normal public water system, is supplied through tubing 20 to the known inlet of the conventional water purifier 10. Feed water is then treated within said known home water purifier 10 by a known process to effect purification and storage of product water. The waste water which is an inevitable byproduct of this known process is discharged out of the said known purifier 10 by a conventional waste water outlet. This waste water is directed through tubing 14 into the cooling water dispenser tube 12 which is so oriented that the dispensing orifices 22 are facing radially inward and directly against the outside surfaces of the sleeve 11. Upon emergence out of the orifice 21 in form of drops or spray, the waste water to be used as cooling water impinges on the porous surface of the sleeve 11 and is transported by capillary action throughout all portions of the sleeve, from where it evaporates into the atmosphere at the natural rate dependent on the prevailing atmospheric conditions, and humidity of the surrounding air in particular. Since most of the thermal energy consumed in such sustained evaporative process will have to come directly from the porous sleeve 11, the body of the known home water purifier 10 enclosed by it and from the product water stored within, the temperature of these components will have to decrease or cool off accordingly and in agreement with applicable laws of physics.

In the cooled product water delivery cycle, valve actuator 15 is caused to rotate by application of tangential force to its lever. As a result, cooled product water is expelled under line pressure out of the known home water purifier and through the spout 16. When the force is removed from the lever of the valve actuator 15, the conventional spring of the known valve returns the valve actuator 15 to its neutral position.

The excess of waste water which cannot be used for evaporative cooling accumulates inside of the evaporative cooler body 21 and is retained as a reserve until its level reaches an overflow outlet 18, through which it is discharged overboard. Should overflow outlet 18 plug up, the excess cooling water will eventually drain through the vent holes 17.

Figure 2:
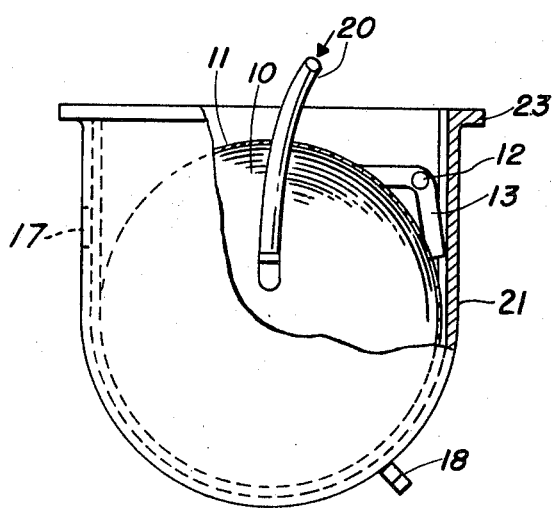
FIG. 2 is an end view with section broken away.

Referring now to FIG. 2, the anti-syphoning air gap feature is provided by locating the cooling water dispenser tube 12 higher than the vent holes 17 and the cooling water overflow 18, and away from the water-saturated surface of sleeve 11. Due to this arrangement, the cooling water level cannot under any circumstances reach the cooling water dispenser tube 12, and eventual backflow of the cooling water due to the syphoning becomes imossible.

Figure 3:
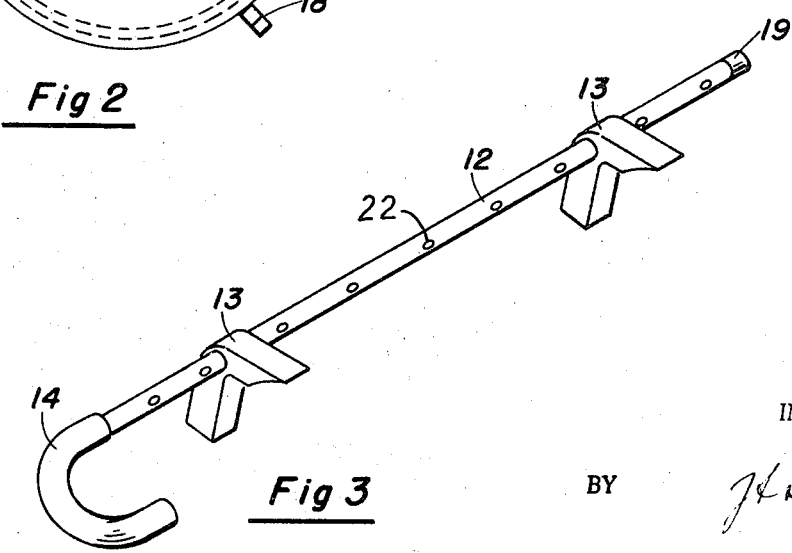
FIG. 3 is a detail of the cooling water dispenser assembly.

It may be understood that all of the parts previously described in the embodiments of FIGS. 1, 2 and 3 may be made of plastic or other suitable non-corrosive materials.

Having described my invention, I now claim:

1. An evaporative cooling device comprising,
   a water purifier having a generally cylindrical shape for receiving feed water and processing and holding and discharging purified water out of a first discharge line and waste water out of a second discharge line,
   a sleeve tightly fitted to said water purifier, said sleeve being made of porous material able to transport water within its body by capillary action,
   a cooler body in the form of a container for housing said water purifier and said sleeve,
   a cooling water dispenser means for delivering waste water from said second discharge line to said sleeve,
   said container having an impervious bottom for collecting excess portions of said waste water delivered to said sleeve,
   a cooling water overflow outlet incorporated in said container at a spaced location above the bottom thereof,
   a number of vent holes in the walls of said container positioned above said overflow outlet for allowing atmospheric air to communicate with the inside volume of said container,
   and said cooling water dispenser means is positioned above said water overflow outlet and said vent holes.

2. An evaporative cooling device according to claim 1 wherein,
   said cooling water dispenser means comprises a line having a plurality of holes spaced along the length thereof,
   and said line being positioned along the length of said water purifier and said sleeve for discharging said waste water along the length of said sleeve.

3. An evaporative cooling device according to claim 2 wherein,
   said bottom portion having a half cylindrical shape corresponding to the cylindrical shape of said water purifier,
   and said water purifier and sleeve being operatively positioned immediately adjacent the bottom surface of said bottom portion.

4. An evaporative cooling device according to claim 3 wherein,
   said cooling water dispenser line being positioned adjacent the upper portion of said water purifier and sleeve.

* * * * *